US010616267B2

(12) United States Patent
Bartos et al.

(10) Patent No.: US 10,616,267 B2
(45) Date of Patent: Apr. 7, 2020

(54) USING REPETITIVE BEHAVIORAL PATTERNS TO DETECT MALWARE

(71) Applicant: Cisco Technology, Inc., San Jose, CA (US)

(72) Inventors: Karel Bartos, Prague (CZ); Jiří Havelka, Rudná (CZ); Martin Neznal, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 15/648,850

(22) Filed: Jul. 13, 2017

(65) Prior Publication Data

US 2019/0020663 A1 Jan. 17, 2019

(51) Int. Cl.
*H04L 29/06* (2006.01)
*H04L 12/26* (2006.01)
(Continued)

(52) U.S. Cl.
CPC .......... *H04L 63/145* (2013.01); *G06N 20/00* (2019.01); *H04L 43/08* (2013.01); *H04L 63/1425* (2013.01); *H04L 67/42* (2013.01); *H04L 41/16* (2013.01); *H04L 43/026* (2013.01); *H04L 63/1458* (2013.01)

(58) Field of Classification Search
CPC ............... H04L 63/145; H04L 63/1425; H04L 63/1458; H04L 63/14; H04L 63/1408; H04L 63/1441; H04L 43/08; H04L 43/026; H04L 67/42; H04L 41/16; G06N 20/00
See application file for complete search history.

(56) References Cited

U.S. PATENT DOCUMENTS 8,661,544 B2 2/2014 Yen et al.
8,677,487 B2 3/2014 Balupari et al.
(Continued)

OTHER PUBLICATIONS

Bilge, et al., "Disclosure: detecting botnet command and control servers through large-scale NetFlow analysis", ACSAC '12 Proceedings of the 28th Annual Computer Security Applications Conference, 2012, pp. 129-138, ACM.
(Continued)

*Primary Examiner* — Ali S Abyaneh
*Assistant Examiner* — Alexander R Lapian
(74) *Attorney, Agent, or Firm* — Behmke Innovation Group LLC; James Behmke; Stephen D. LeBarron

(57) ABSTRACT

In one embodiment, a device generates one or more time series of characteristics of client-server communications observed in a network for a particular client in the network. The device partitions the one or more time series into sets of time windows based on patterns present in the characteristics of the client-server communications. The device compares the characteristics of the client-server communications from the partitioned time windows to determine measures of behavioral similarity between the compared time windows. The device provides the measures of behavioral similarity between the compared time windows as input to a machine learning-based malware detector. The device causes performance of a mitigation action in the network when the machine learning-based malware detector determines that the particular client in the network is infected with malware.

17 Claims, 14 Drawing Sheets

(51) Int. Cl.
    *G06N 20/00*     (2019.01)
    *H04L 12/24*     (2006.01)

(56) References Cited

U.S. PATENT DOCUMENTS

| | | |
|---|---|---|
| 9,143,522 B2 | 9/2015 | Wang et al. |
| 2011/0154132 A1* | 6/2011 | Aybay .................. H04L 43/026 714/49 |
| 2011/0154492 A1 | 6/2011 | Jeong et al. |
| 2012/0173710 A1* | 7/2012 | Rodriguez ............ H04L 43/026 709/224 |
| 2013/0347114 A1* | 12/2013 | Altman ............... H04L 63/1425 726/24 |
| 2016/0247158 A1* | 8/2016 | Kolotinsky ........ G06Q 20/4016 |
| 2017/0063921 A1* | 3/2017 | Fridman ............. H04L 63/1466 |
| 2017/0155668 A1 | 6/2017 | Bartos et al. |
| 2018/0041528 A1* | 2/2018 | Machlica ............ H04L 63/1425 |
| 2018/0219723 A1* | 8/2018 | Scarpelli ............. H04L 63/1425 |

OTHER PUBLICATIONS

Gu, et al., "BotSniffer: Detecting Botnet Command and Control Channels in Network Traffic", Proceedings of the 15th Annual Network and Distributed System Security Symposium, 2008, 18 pages, Computer Science and Engineering Faculty Publications, CORE Scholar, Wright State University.

Kind, et al., "Histogram-based traffic anomaly detection", IEEE Transactions on Network and Service Management, vol. 6, No. 2, pp. 110-121, Jun. 2009, IEEE.

\* cited by examiner

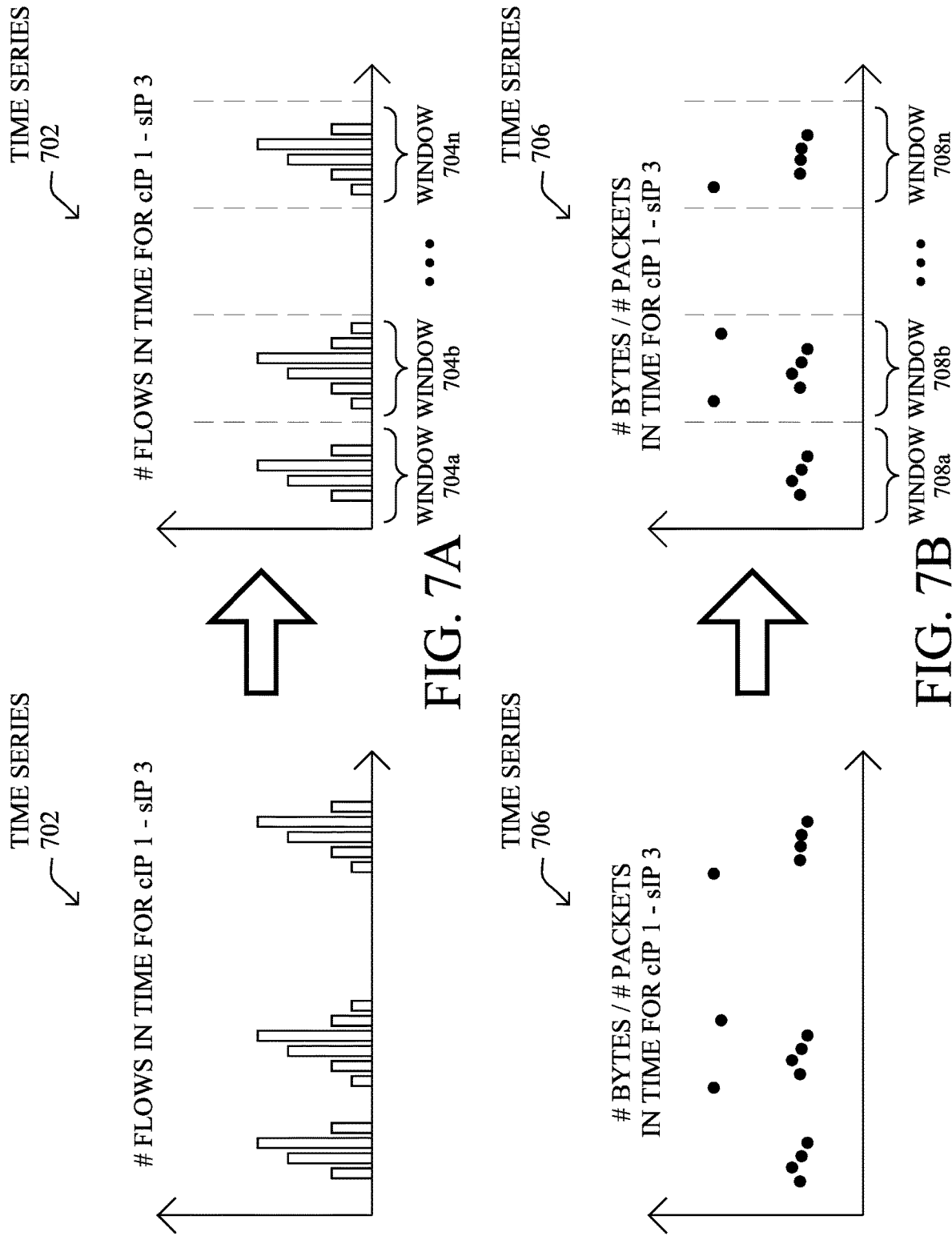

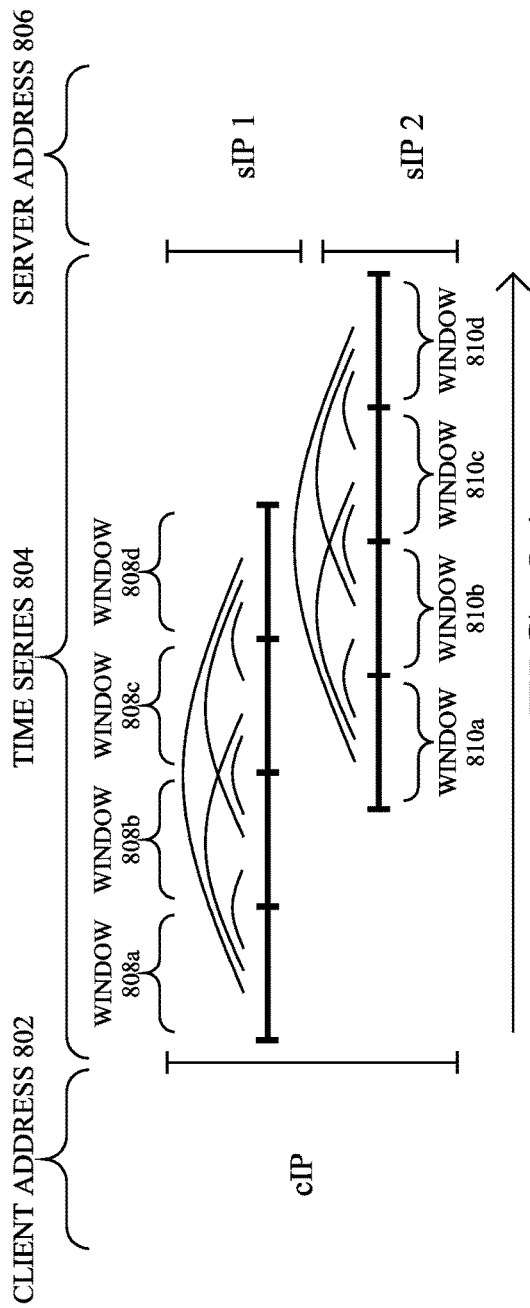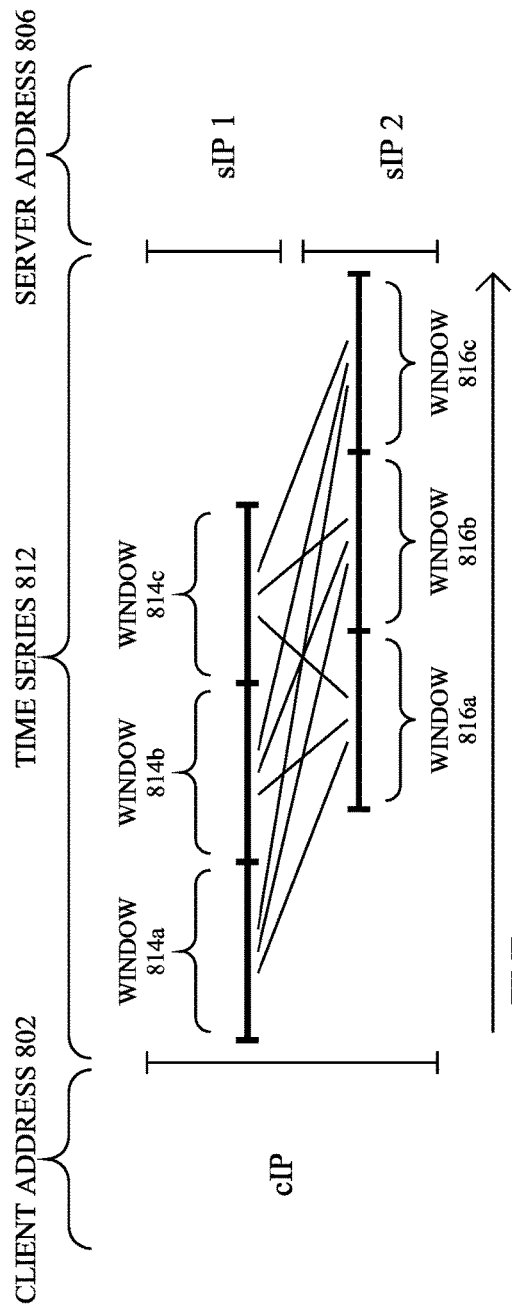

USING REPETITIVE BEHAVIORAL PATTERNS TO DETECT MALWARE

TECHNICAL FIELD

The present disclosure relates generally to computer networks, and, more particularly, to the using repetitive behavioral patterns to detect malware.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master, such as a command & control (C&C) server. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7B illustrate examples of time series being partitioned into time windows;

FIGS. 8A-8C illustrate examples of determining behavioral similarities between time windows;

DESCRIPTION OF EXAMPLE EMBODIMENTS

Overview

Figure 1A:
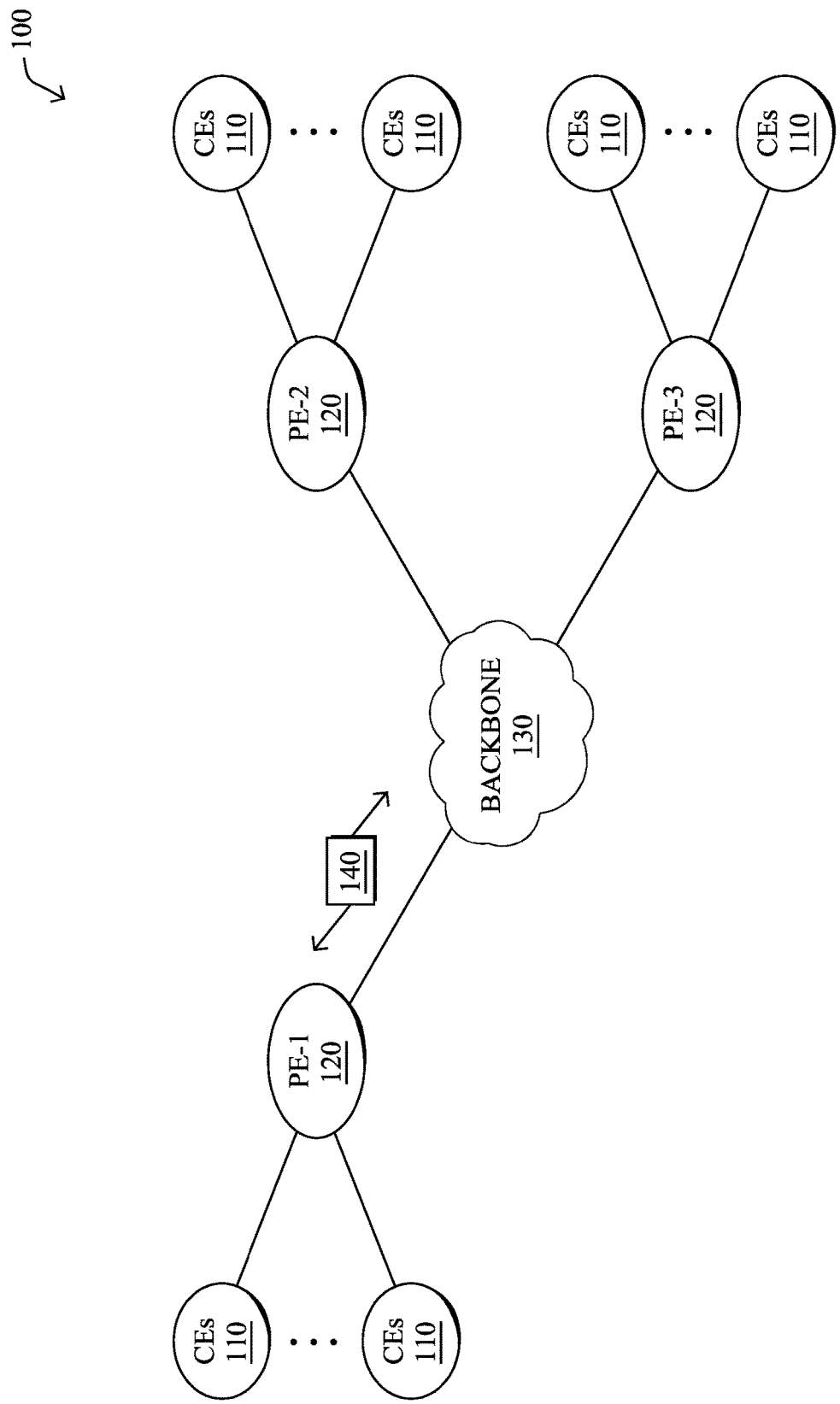
FIGS. 1A-1B illustrate an example communication network.

According to one or more embodiments of the disclosure, a device generates one or more time series of characteristics of client-server communications observed in a network for a particular client in the network. The device partitions the one or more time series into sets of time windows based on patterns present in the characteristics of the client-server communications. The device compares the characteristics of the client-server communications from the partitioned time windows to determine measures of behavioral similarity between the compared time windows. The device provides the measures of behavioral similarity between the compared time windows as input to a machine learning-based malware detector. The device causes performance of a mitigation action in the network when the machine learning-based malware detector determines that the particular client in the network is infected with malware.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in is network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
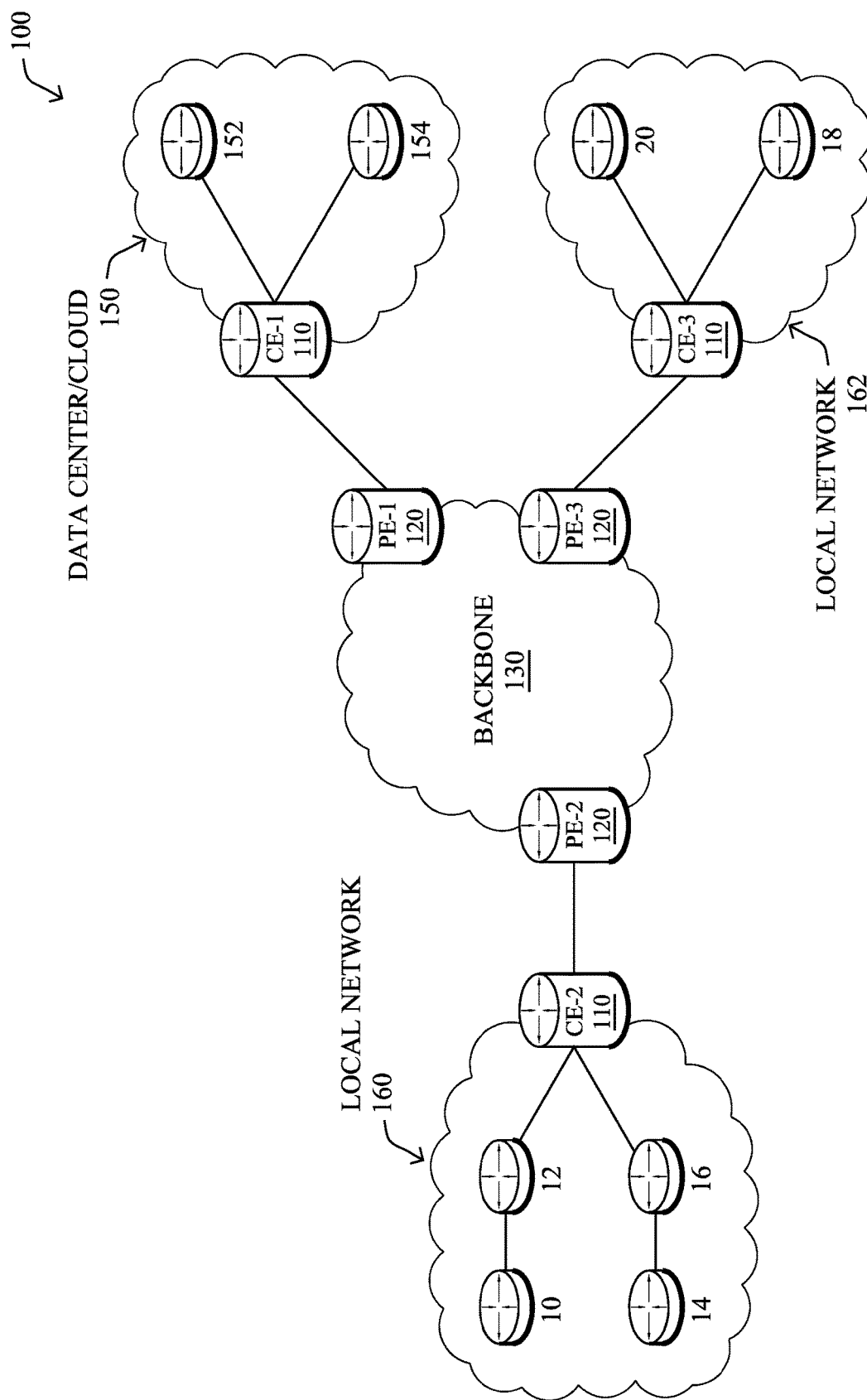

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
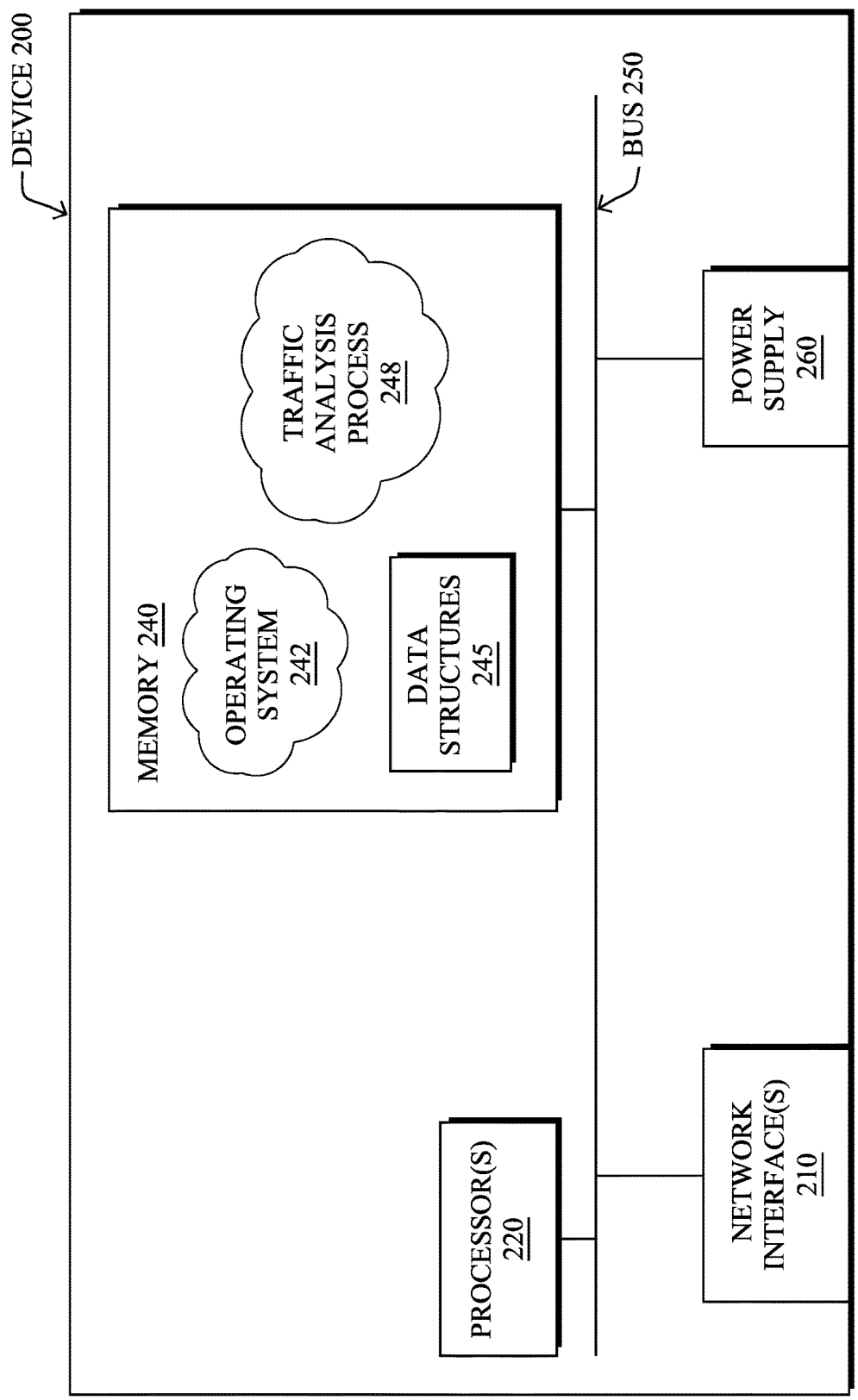
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered traffic data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
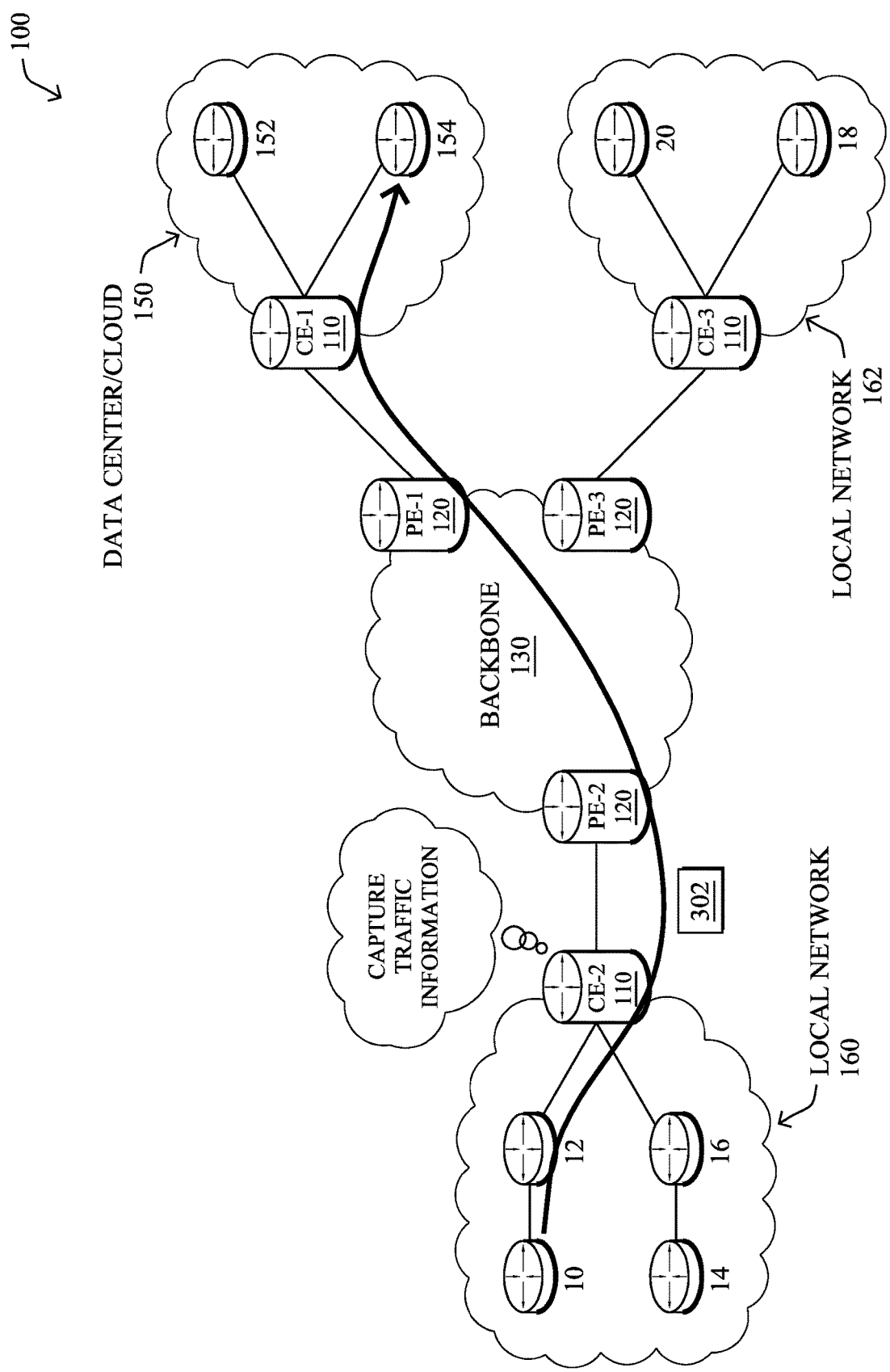
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., Hypertext Transfer Protocol (HTTP) information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

Figure 4:
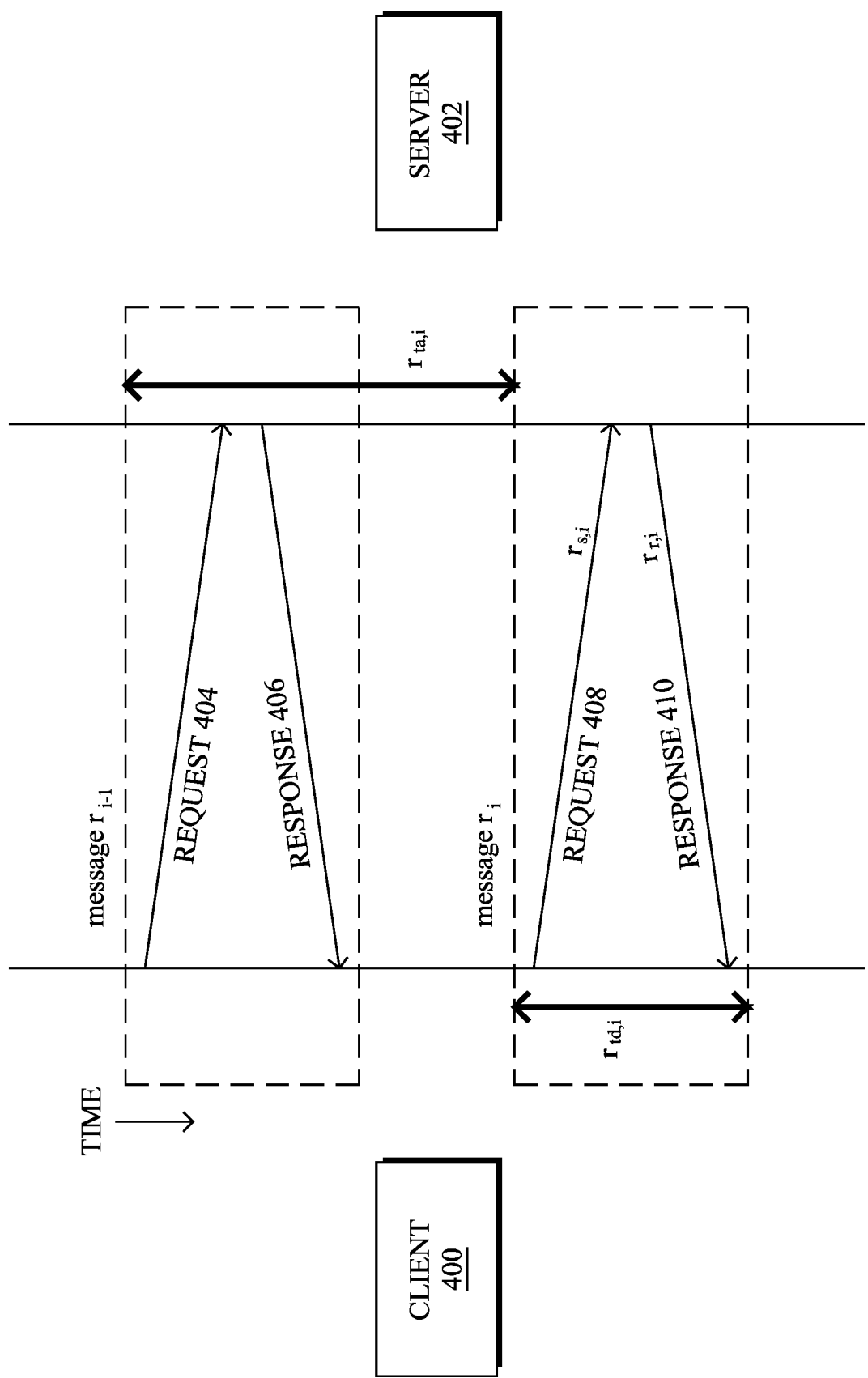
FIG. 4 illustrates an example communication channel.

Operationally, FIG. 4 illustrates an example communication channel, in accordance with various embodiments herein. In general, a communication channel refers to a set of one or more messages exchanged between two given network nodes/hosts over the course of time. For example, as shown, consider the case of a client device 400 that is in communication with a remote server 402. Client 400 and server 402 may exchange any number of messages that may comprise a request and/or a response. For example, individual messages/traffic exchanged between client 400 and server 402 may include, but are not limited to, HTTP(S) request-response pairs, a single TCP or UDP communication, a NetFlow message, domain name system (DNS) request-response pairs, or any other type of network traffic.

An intermediate device located along the path between client 400 and server 402 (e.g., a CE router 110, a cloud service device, a security device, etc.) may capture various traffic data regarding the communication channel shown. For example, such an intermediate device may capture traffic data regarding the $i^{th}$ message exchange, $r_i$, between client device 400 and server 402. Message $r_i$ may comprise a request 408 sent from client 400 to server 402 and a response 410 sent from server 402 to client 400. Similarly, the prior message, $r_{i-1}$, may include a request 404 and a response 406.

The intermediate device between client 400 and server 402 may capture any or all of the following traffic data characteristics regarding message The number of bytes in request 408 ($r_{s,i}$), The number of bytes in response 410 ($r_{r,i}$), The number of packets in request 408 and/or response 410, The time duration of the request-response (R-R) loop of message $r_i$($r_{td,i}$), The inter-arrival time between when client 400 sent request 404 of message $r_{i-1}$ and when client 400 sent request 408 of message $r_i$($r_{ta,i}$), Timestamp information or other timing information regarding request 408 and response 410, and/or Header information or any other information available from requests or responses 404-410, themselves.

As would be appreciated, the intermediate device between client 400 and server 402 may capture other features regarding the communication channel, as well, in further embodiments.

To properly analyze the observed network traffic (e.g., to identify the application associated with the traffic), an appropriate representation of captured communication traces is crucial. The representation must be able to capture important patterns of their behavior, while also allowing effective manipulation. Thus, in some embodiments, the network communication channel associated with an application can be treated as a set of independent messages (e.g., packets, NetFlow or IPFIX records, web requests/responses, etc.). For example, if the traffic flow data is captured in a NetFlow or IPFIX record, the messages may be the individual packets sent and received in that record.

In some embodiments, the analyzing device may represent each message of a communication channel as a set of N-number of observed characteristics/features of the message, such as its size, timing, header information, etc. As would be appreciated, the number of different characteristics assessed may be varied and may depend on which features/traffic characteristics are captured in the traffic data. In other words, each message may be represented as an N-dimensional point in a multi-dimensional, metric space, also referred to herein as the "message space." In turn, each communication channel may be viewed as the set of M-number, N-dimensional points that represent the constituent messages of the channel.

As noted above, many forms of malware exist, such as botnets, and are designed to covertly infiltrate the targeted hosts and perform tasks stealthily with a minimal exposure to detection systems. To avoid detection, more sophisticated malware does not perform all of its tasks as a single action, but rather decomposes the tasks into several actions executed over time. Precise instructions and execution timings are sent over command and control (C&C) channels, which are established and maintained between an infected host and the attacker for longer time periods. To bypass blacklists and feeds, attackers frequently change server IP addresses and hostnames of the channels. This way, attackers are able to maintain control over large groups of infected users with low probability of being exposed or detected.

Using Repetitive Behavioral Patterns to Detect Malware

The techniques herein allow for the detection of malware infections in a network by detecting the presence of C&C channels from network traffic data (e.g., NetFlow or IPFIX records, proxy logs, etc.). In some aspects, the techniques extract behavioral patterns from groups of client-server communications of a user, or a client IP address, and determine measures of similarity within and among the communications that are indicative of C&C channels. In further aspects, the determined measures of similarity can be used as part of an input feature vector for a machine learning-based malware detector.

Specifically, according to one or more embodiments of the disclosure as described in detail below, a device generates one or more time series of characteristics of client-server communications observed in a network for a particular client in the network. The device partitions the one or more time series into sets of time windows based on patterns present in the characteristics of the client-server communications. The device compares the characteristics of the client-server communications from the partitioned time windows to determine measures of behavioral similarity between the compared time windows. The device provides the measures of behavioral similarity between the compared time windows as input to a machine learning-based malware detector. The device causes performance of a mitigation action in the network when the machine learning-based malware detector determines that the particular client in the network is infected with malware.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, certain aspects of the techniques herein model communication patterns of client-server communications between a client and servers with which it communicates. A key assumption of the techniques herein is that C&C channels exhibit behavioral similarities. Accordingly, behavioral analytic techniques are described herein that can detect C&C channels, as well as the presence of malware, based on such similarities. A prototype system using the techniques described herein was also constructed and was shown to be able to detect C&C channels with high precision and recall.

Figure 5:
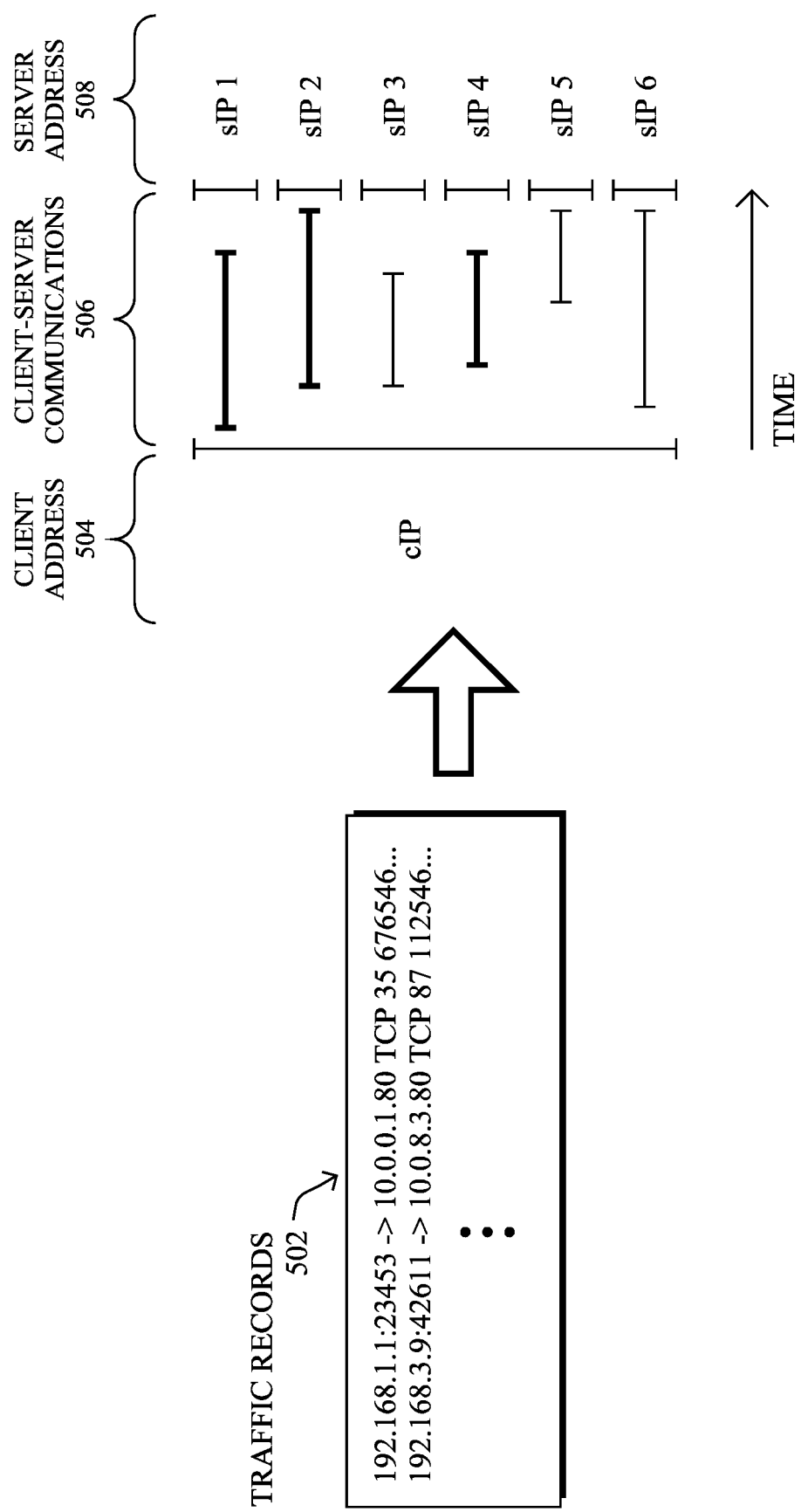
FIG. 5 illustrates an example of communications being identified from traffic records.

FIG. 5 illustrates an example of communications being identified from traffic records, according to various embodiments. As detailed above, one or more networking devices in a network may capture traffic records 502 regarding traffic observed in a network. For example, traffic records 502 may include basic information about the incoming and outgoing network traffic in the form of logs, such as unidirectional or stitched bidirectional NetFlow records, IPFIX records, or HTTP(S) proxy logs. For purposes of illustrating the techniques herein, each record in traffic records 502 is referred to herein as a flow. From traffic records 502, the traffic analysis process may extract any or all of the following features from each flow for further analysis: client IP address or user identity, if available, client port, server IP address, server port, protocol, number of packets and/or bytes transferred from client to server and/or from server to client, starting and/or ending times, etc.

During operation, the traffic analysis process may represent a network communication of a client c as a sequence $C=\{x_1, x_2, x_3, \ldots\}$ of flows from traffic records 502. Note that a 'client' can mean not only a client IP address, but also user identity, MAC address, or other such information, in further embodiments. Notably, as shown, each flow in traffic records 502 may be used to identify client-server communications 506 between a given client address 504 (e.g., client IP address "cIP") and the server addresses 508 with which client address 504 communicated (e.g., a first server IP address "sIP 1," a second server IP address "sIP 2," etc.). Further, timing information may be associated with communications 506 (e.g., based on timestamp information from traffic records 502, etc.), to indicate temporal characteristics of the communications 506, such as start time, end time, and/or duration.

Once the client-server communications 506 have been identified from traffic records 502, the traffic analysis process may assess client-server communications 506 to form any number of time series for the various characteristics of communications 506. Generally, communication between client c and server j is a subsequence of sequence C and can be represented as sequence $C=\{x^j_1, x^j_2, x^j_3, \ldots\}$ of flows. Similar to the representation of client c, a given server j may be represented by its IP address alone or, alternatively, as a grouping of information such as an IP address and port pair, etc. The characteristics of the communications that may be used to form a time series p(x) may include, but are not limited to, any or all of the following:

timestamp: p(x)=timestamp of x (timestamp can mean starting or ending time)

up-bytes with timestamp: p(x)=(timestamp of x, size of uploaded bytes in x)

down-bytes with timestamp: p(x)=(timestamp of x, size of downloaded bytes in x)

number of flows with timestamps etc.

Figure 6A:
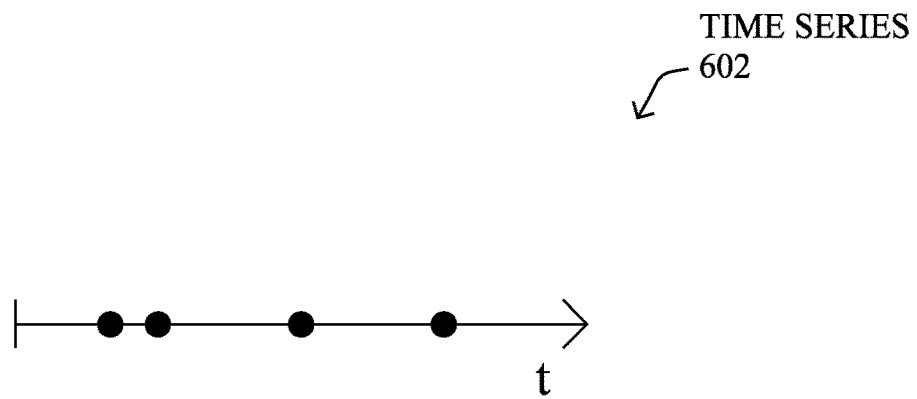
FIGS. 6A-6C illustrate example time series of characteristics from client-server communications.
Figure 6B:
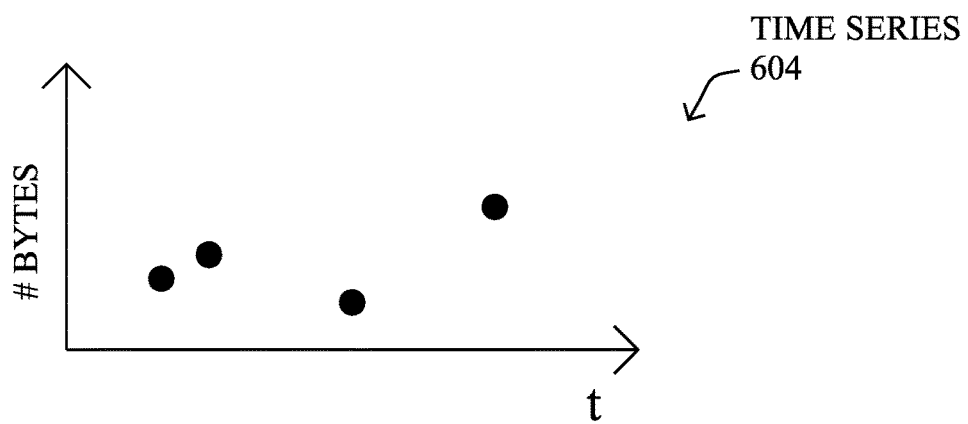
Figure 6C:
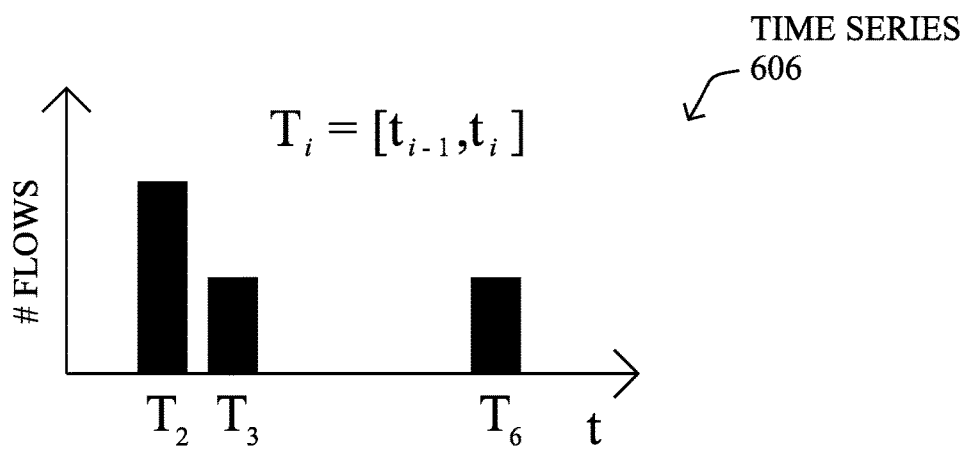

In other words, each client-server communication C can be projected into one or more time series of one or more dimensions, by applying a projection function to each flow. FIGS. 6A-6C illustrate examples time series of characteristics from client-server communications. In FIG. 6A, the timestamps from the client-server communications may be used to form time series 602, potentially on a per-server or group of servers basis. In FIG. 6B, the number of flow bytes and their timestamps from the client-server communications may be used to form time series 604. In FIG. 6C, another time series 606 may be formed using histograms of the number of observed flows from the client-server communications during various time periods (e.g., time period $T_i = [t_{i-1}, t_i]$). As would be appreciated, other time series may also be formed using any other characteristics of the observed client-server communications.

In various embodiments, the traffic analysis process may also partition the generated time series into time windows, where the windows are of constant or varying time spans. Such time windows can be adjacent to one another, overlapping, non-uniformly spaced, or the like. Other partitioning can entail grouping communications according to server, possibly coupled with other information such as server port, etc., and then each group split into partitions with equal time windows or sizes (e.g., number of flows, etc.). By partitioning the time series of characteristics of the client-server communications, the traffic analysis process is better able to detect recurring behavioral patterns.

More specifically, after generating the one or more time series based on the observed characteristics of the client-server communications, the traffic analysis process may attempt to partition the time series into smaller time windows according to observed patterns in the characteristics. The spans of the time windows may generally define the temporal span of each pattern.

By way of example, FIGS. 7A-7B illustrate examples of time series being partitioned into time windows, according to various embodiments. In FIG. 7A, assume that the traffic analysis process has generated a time series 702 that comprises histograms of the number of flows observed over time between the client having IP address "cIP 1" and the server having IP address "sIP 3." In turn, the traffic analysis process may partition time series 702 into n-number of time windows 704 (e.g., a first time window 704a, a second time window 704b, etc.).

Similarly, in FIG. 7B, assume that the traffic analysis process has generated another time series 706 regarding the number of bytes and/or packets observed over time between the client having IP address "cIP 1" and the server having IP address "sIP 3." In such a case, the traffic analysis process may partition time series 706 into n-number of time windows 708 (e.g., a first time window 708a, a second time window 708b, etc.).

The spans of the time windows for a given time series may be fixed or predefined, in some implementations. However, testing has demonstrated that better results can be achieved when the spans of the time windows are automatically calculated from the input traffic data.

One way that the traffic analysis process may find an optimal time window span for a particular time series is to start with a large window span and keep decreasing the span as long as the resulting time windows still exhibit some indicative pattern. For example, when the client-server communication include a group of servers that are all persistent over a larger time span, the traffic analysis process can determine the shortest common period in communication with all of these servers by iteratively shortening the spans of adjacent windows while still preserving the occurrence of all the servers within the time windows. In turn, the traffic analysis process may use the shortest time window span/width that satisfies this condition to partition the time series of characteristics of the client-server communications.

Figure 8C:
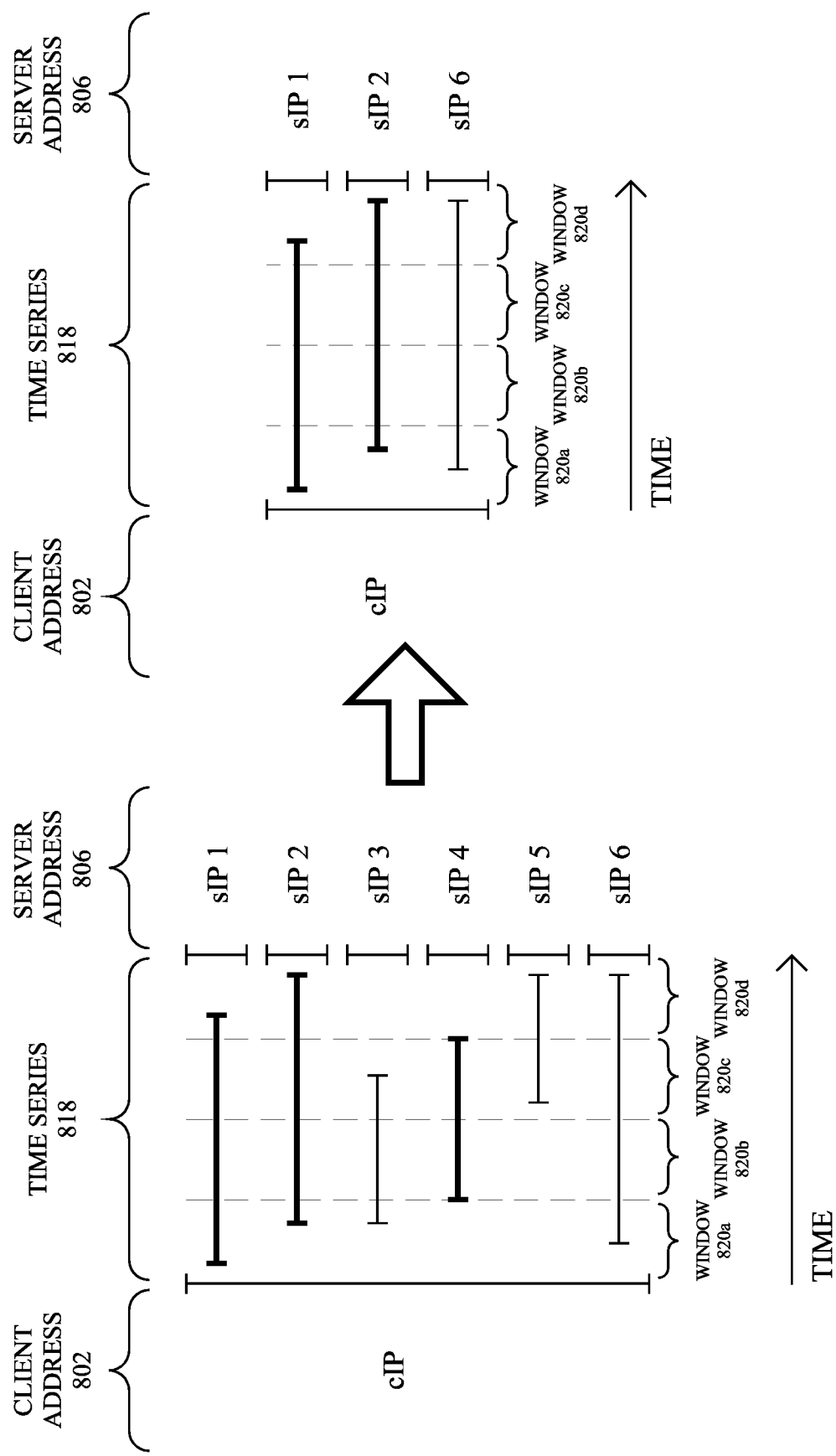

In various embodiments, the traffic analysis process may compare the characteristics of the client-server communications from the partitioned time windows, to determine measures of behavioral similarity between the compared time windows. Example approaches to determining the measures of similarity may include, but are not limited to, dynamic time warping (DTW), autocorrelation, other statistical analysis techniques, or the like. FIGS. 8A-8C illustrate examples of determining behavioral similarities between time windows.

In one embodiment, the traffic analysis process may determine the similarities between the characteristics of a client-server communication across different time windows of the same time series. For example, as shown in FIG. 8A, assume that the client having client address 802 (e.g., client IP address "cIP") communicates with first and second server addresses 806 (e.g., server IP addresses "sIP 1" and "sIP 2"), resulting in first and second time series 804 for the characteristics of these client-server communications (e.g., number of bytes, number of flows, number of packets, etc.). Using the above techniques, the process may also partition these time series 804 into time windows 808a-808d and 810a-810d, respectively.

To determine the measures of similarity between the characteristics in different time windows of a given time series, the traffic analysis process may use DTW or another comparison technique. As opposed to Fourier transform, DTW is able to find communication similarities, even when the communication does not exhibit periodic behavior (e.g. when the attacker is trying to evade detection systems by manipulating inter-arrival times). Such similarities are good indicators of C&C channels and may be determined performing pairwise comparisons between the characteristics from each time window of the series and, e.g., computing an average similarity value describing the uniformity of each client-server communication in time. For example, the traffic analysis process may compare the characteristics from time window 808a to those of 808b, 808c, and 808d, from time window 808b to those of 808c and 808d, etc.

In a further embodiment, the traffic analysis process may determine the measures of behavioral similarity across client-server communications with different servers. For example, as shown in FIG. 8B, assume that the client server communications between client address 802 and server addresses 806 result in the time series 812. Each of the two time series 812 may be partitioned into time windows 814a-814c and 816a-816c, respectively. In turn, the traffic analysis process may determine the similarities between the different time windows 814 and 816 between the different time series 812 for the communications with the different server addresses 806.

In particular, for a pair of communication streams (e.g., between the client and different servers), the traffic analysis process may compute an average similarity value as above, but this time based on DTW scores for pairs time windows, where one is taken from the first communication stream and the other from the second stream. For example, as shown, the traffic analysis process may compare the characteristics from time window 814a of the first time series 812 to that of time windows 816a-816c from the other time series 812.

Based on such pairwise similarities between communications with different servers, the traffic analysis process can also determine whether larger groups of servers share the same or closely similar patterns originating from the same client. Finding such larger groups using pairwise similarity scores can be done in any suitable manner. For example, the traffic analysis process may greedily grow server sets, e.g., by adding a server as long as its similarity to the current set (or its representative member) is above a threshold).

In yet another embodiment, the traffic analysis process may look for global similarities across the different client-server communications. Here, "global" refers to patterns pertaining to larger groups of communications than simply pairs of servers (e.g., as in the case illustrated in FIG. 8B), up to the full set of all servers with which the client communicated. For example, one such "global" pattern may correspond to a common set of low-popularity servers that appear across all time windows analyzed for similarity, with each time window having the characteristics of all communication streams from the client to all accessed servers.

As shown in FIG. 8C, consider the case in which there are six time series 818 of characteristics for client-server communications between client address 802 and six different server addresses 806 (e.g., "sIP 1" through "sIP 6"). In such a case, the traffic analysis process may partition each of these time series 818 into time windows 820a-820d. For example, assume that the time series 818 between client address 802 and the server addresses 806 sIP 1, sIP 2, and sIP 6 are all similar in nature across time windows 820a-820d.

In some cases, the traffic analysis process may identify similar patterns using, e.g., a combination of similarity checks, which may be applied iteratively and/or in conjunction with one another. Examples of such similarity checks may include, but are not limited to, the following:

Test for periodicity

Test for similarities among traffic feature distributions—in this context, the test for periodicity can be generalized as a test whereby distributions (e.g. histograms) of individual features or characteristics of the network traffic are compared Test for uniformity (e.g., based on summary statistics such as mean and variance)

Test on the proportion of successful versus unsuccessful communications

As noted, the time windows from the time series can also be shifted and may or may not overlap during the comparisons. For example, some behaviors can appear regularly across time, such as when malware communicates with a set of one or more servers within some time window and later communicates with a different set of one or more servers in another time window. Similarly, in further embodiments, behavioral patterns can also be assessed and correlated across different clients or users. For example, the case for detecting C&C channels can be reinforced if multiple clients exhibit closely similar communication patterns to low-popularity servers.

As noted above, the measures of behavioral similarity between the compared time windows may be provided as input to a machine learning-based malware detector. For example, feature vectors can be derived using any or all of the above techniques and concatenated into fixed-sized vectors representing communication from the client to a single server or communication from the client to a group of servers (e.g., summary statistics can be computed such as the mean and standard deviation, etc.). In turn, these feature vectors can be used as input to a machine learning-based malware detector, such as a machine learning-based classifier. Such a classifier may be an unsupervised classifier or supervised, if labeled samples of C&C traffic is available.

When the malware detector determines that a particular client in the network is infected with malware, based on an analysis of the traffic associated with that client, any number of mitigation actions can be performed in the network. In some cases, the mitigation action may entail generating an alert (e.g., an email, automated phone call, text message, etc.) for a network administrator, the user of the client, or other interested part. In further cases, the mitigation action may entail triggering one or more automatic actions to be taken by the network. For example, if the traffic of the client indicates that the client is likely infected with malware, the traffic may be blocked, quarantined, flagged for further analysis (e.g., using DPI, etc.), etc.

Figure 9A:
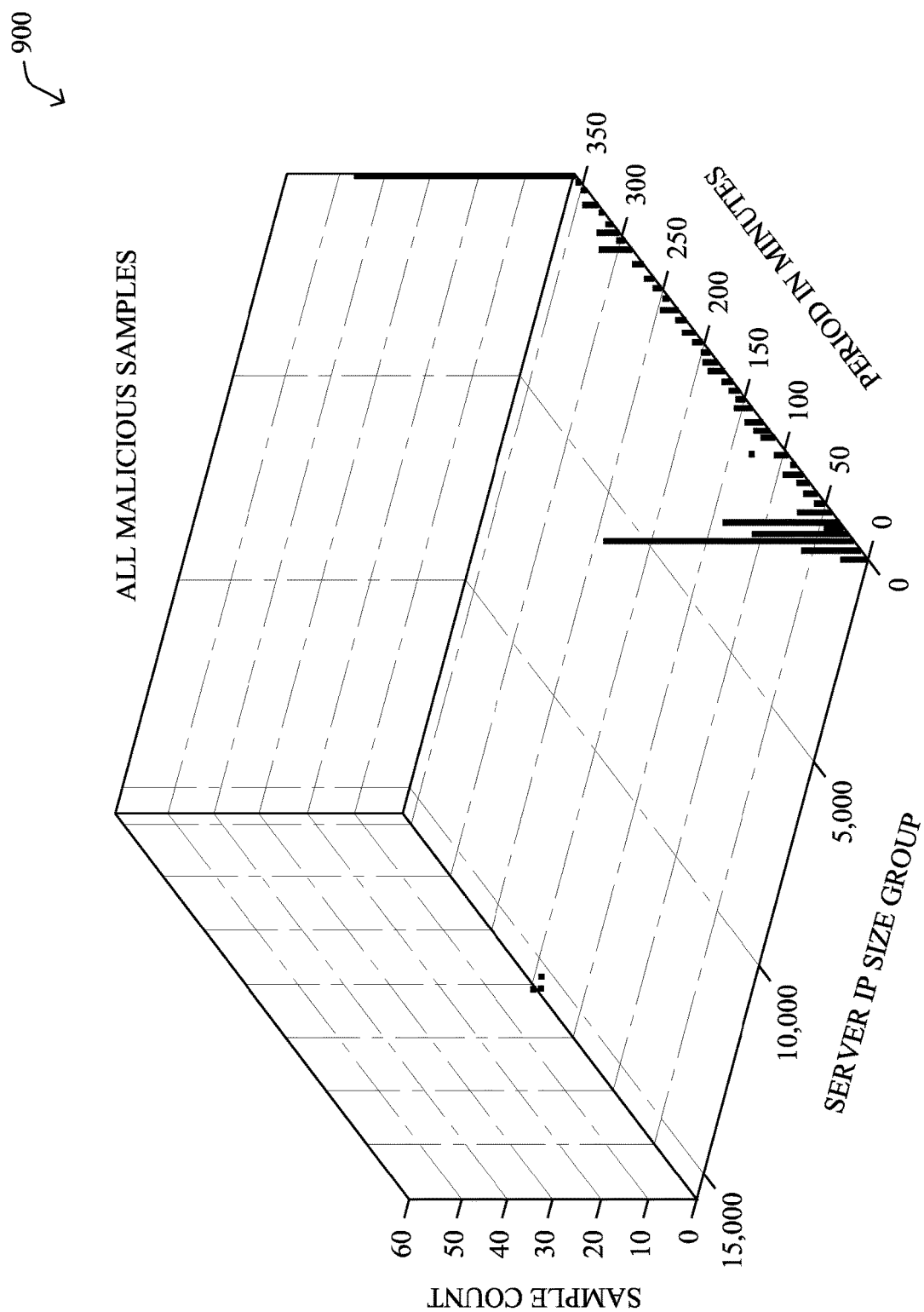
FIGS. 9A-9B illustrate example histograms of test results using the techniques herein.
Figure 9B:
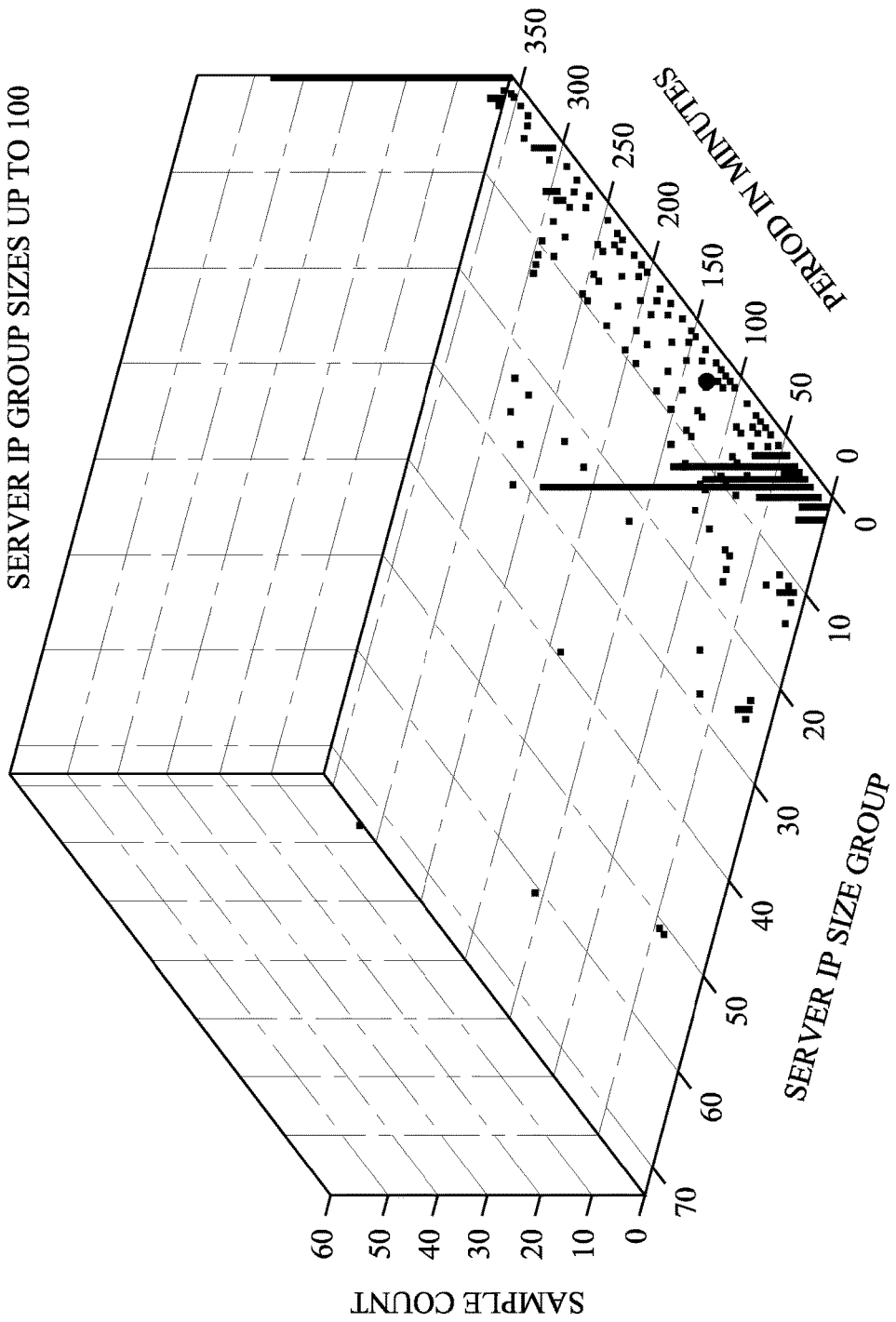

FIGS. 9A-9B illustrate example histograms of test results using the techniques herein. In particular, a preliminary test of the techniques herein was conducted using traffic data captures of 444 botnet samples. Plot 900 in FIG. 9A illustrates a three dimensional plot of the sample count, server IP group size, and time periods in minutes, along the three axis shown, from these captures. In turn, the captured traffic was analyzed for occurrences of persistent groups of server, recurring across at least 18 hours, and the shortest period length with which the group recurs was determined, up to a maximum length of six hours. FIG. 9B illustrates a plot 910 of the botnet samples exhibiting persistent groups of servers of at most size 100. Thus, preliminary assessment of the client-server communications for the botnet samples indicates that these samples often exhibited repetitive behavioral patterns.

Figure 10B:
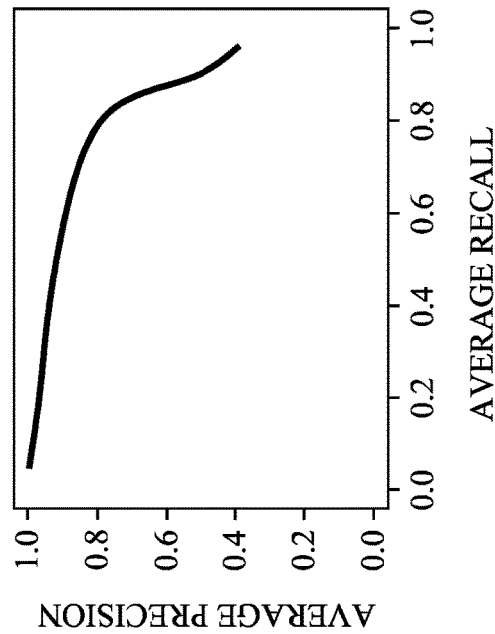
FIGS. 10A-10B illustrate example performance curves using the techniques herein.
Figure 10A:
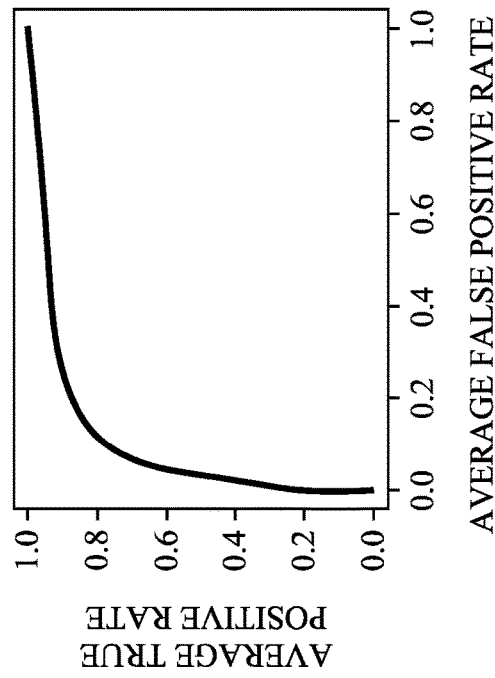

A prototype machine learning-based malware classifier was also constructed to verify the efficacy of the techniques herein. In particular, a sample set of traffic records for approximately 10,000 clients were assessed using the malware classifier, with 5% of the clients infected by malware exhibiting malicious C&C communications. In particular, an SMV classifier was trained using the proposed input features based on the measures of behavioral similarity between the time windows for the time series. The resulting SVM classifier exhibited the receiver operating characteristic (ROC) curve 1000 shown in FIG. 10A and the precision-recall curve 1010 shown in FIG. 10B. Notably, as shown, the trained classifier was able to achieve approximately 80% recall with 80% precision. This means that a classifier using the techniques herein would be expected to be able to detect approximately 80% of malware infected clients and, of these, 4 out of 5 detected incidents are actual infections.

Figure 11:
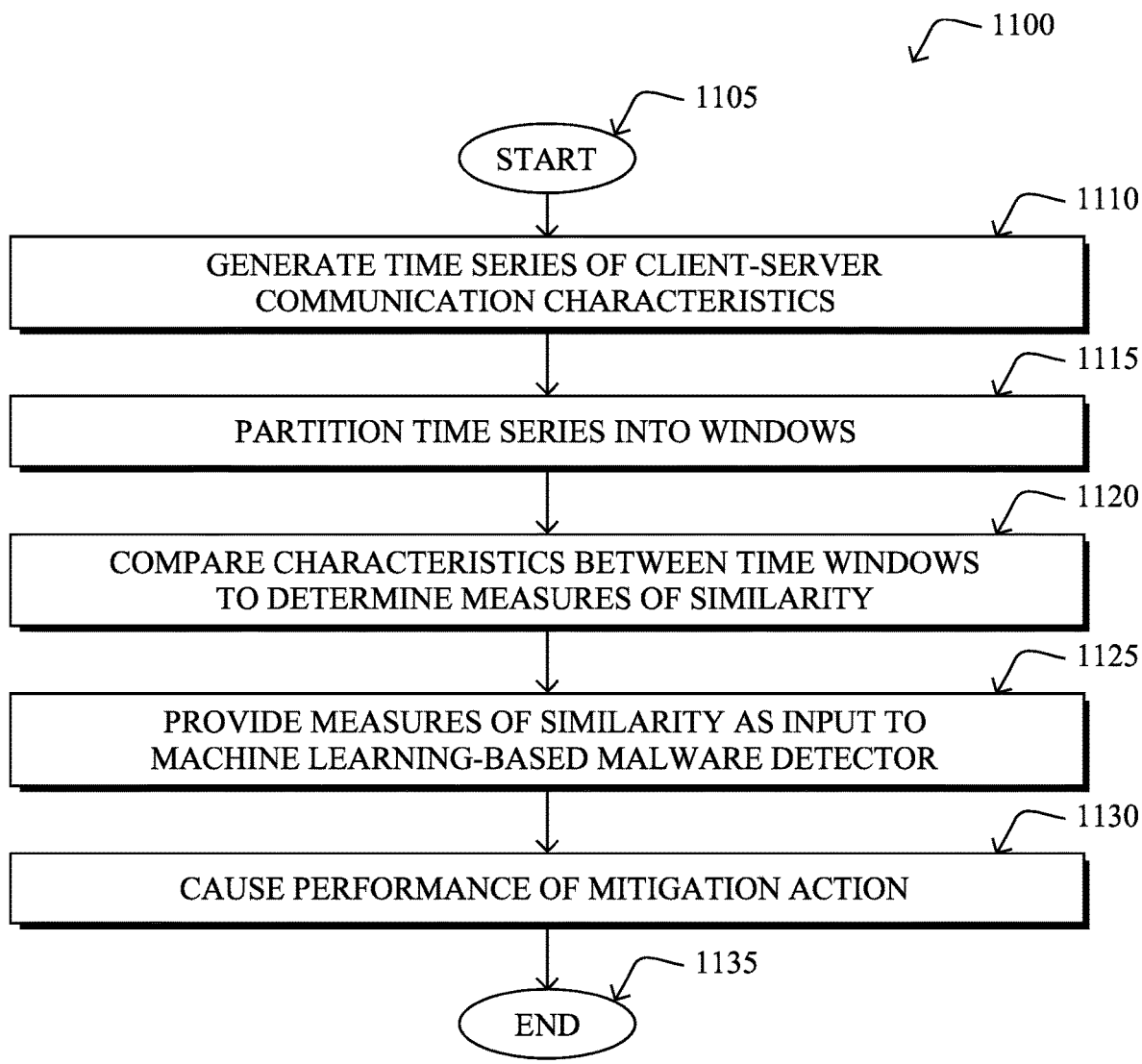
FIG. 11 illustrates an example simplified procedure for detecting malware.

FIG. 11 illustrates an example simplified procedure for detecting malware, in accordance with one or more embodiments described herein. For example, a non-generic, specifically configured device (e.g., device 200) may perform procedure 1100 by executing stored instructions (e.g., process 248). The procedure 1100 may start at step 1105, and continues to step 1110, where, as described in greater detail above, the device may generate one or more time series of characteristics of client-server communications observed in a network for a particular client in the network. Such characteristics may include, for example, the number of bytes observed at different times in the communications, the number of flows observed at different times in the communications, the number of packets observed at different times in the communications, and/or any other characteristics of the client-server communications that can be determined from captured traffic data logs regarding the communications.

At step 1115, as detailed above, the device may partition the one or more time series into sets of time windows based on patterns present in the characteristics of the client-server communications. In particular, the device may attempt to subdivide the characteristics of the time series by time windows that may or may not overlap. In some embodiments, the device may iteratively decrease a span of a time window until a shortest time window is identified such that the characteristics of the client-server communications in the time windows adjacent to a given one of the time windows exhibit the same pattern as that of the given time window. In further cases, predefined time window spans may be used.

At step 1120, the device may compare the characteristics of the client-server communications from the partitioned time windows to determine measures of behavioral similarity between the compared time windows, as described in greater detail above. In some embodiments, the device may compare the characteristics between time windows for a time series representing the communication between the client and a particular server. In another embodiment, the device may compare the characteristics between time windows for different time series representing the communications between the client and different servers. In further embodiments, each of the partitioned time windows may be associated with the characteristics of all of the client-server communications for the particular client observed in that time window. In such a case, the device may determine the measures of behavioral similarity by testing for periodicity between time windows, testing for similarities among traffic feature distributions, testing for uniformity between time windows, testing the proportion of successful and unsuccessful communications, or the like. Example measures of behavioral similarity between time windows may also include DTW values or other measures, to represent how similar the characteristics from one time window are to the characteristics from another time window.

At step 1125, as detailed above, the device may provide the measures of behavioral similarity as input to a machine learning-based malware detector. For example, the measures of behavioral similarity may be included in a feature vector for a machine learning-based classifier. Such a feature vector may also take into account any other available information regarding the client, server(s), and or client-server communications/traffic that may exist. In other words, the malware detector may be configured to determine whether a given client is infected with malware based on the client-server communications associated with the client behaving in a way that would indicate that the traffic is C&C traffic.

At step 1130, the device may cause the performance of a mitigation action in the network when the machine learning-based malware detector determines that the particular client in the network is infected with malware. Such a mitigation action may entail, for example, generating an alert, blocking the traffic associated with the client, adjusting how the traffic associated with the client is treated by the network (e.g., by quarantining the traffic, subjecting the traffic to deeper security scrutiny, adjusting the priority or routing of the traffic, etc.). Procedure 1100 then ends at step 1135.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the following:

Detection of stealthy C&C channels—The system is able to detect C&C channels that keep a low profile and even when the attacker changes IP addresses and servers frequently (which is a typical evasion technique of attackers), thanks to the long-term similarity of C&C behavioral patterns.

The techniques are also applicable in cases where the payload of the communication should not, or cannot, be revealed, such as with the use of TLS.

The input data can be acquired from network monitoring components already deploying in an existing network (e.g., proxy servers, DNS servers, NetFlow collectors).

The techniques herein also complement existing security systems and can be easily combined with them to maximize the detection efficacy.

While there have been shown and described illustrative embodiments that provide for the detection of malware in a network, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as HTTP and DNS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating, by a device, one or more time series of characteristics of client-server communications observed in a network for a particular client in the network;
partitioning, by the device, the one or more time series into sets of time windows based on patterns present in the characteristics of the client-server communications by iteratively decreasing a span of a time window until a shortest time window is identified such that the characteristics of the client-server communications in time windows adjacent to a given one of the time windows exhibit a same pattern as that of the given time window;
comparing, by the device, the characteristics of the client-server communications from the partitioned time windows to determine measures of behavioral similarity between the compared time windows, wherein comparing includes:
performing pairwise comparisons of the characteristics of the client-server communications between the client and different sets of servers from different ones of the partitioned time windows;
providing, by the device, the measures of behavioral similarity between the compared time windows as input to a machine learning-based malware detector; and
causing, by the device, performance of a mitigation action in the network when the machine learning-based malware detector determines that the particular client in the network is infected with malware.

2. The method as in claim 1, wherein the pattern comprises client-server communications with a particular set of servers with which the particular client communicated.

3. The method as in claim 1, wherein the characteristics of the client-server communications comprise one or more of: a number of traffic flows associated with the client-server communications, a number of bytes associated with the client-server communications, or a number of packets associated with the client-server communications.

4. The method as in claim 1, wherein comparing the characteristics of the client-server communications from the partitioned time windows to determine measures of behavioral similarity between the compared time windows comprises:
performing, by the device, pairwise comparisons of the characteristics of the client-server communications between the particular client and the same server from different ones of the partitioned time windows.

5. The method as in claim 1, wherein each of the partitioned time windows is associated with the characteristics of all of the client-server communications for the particular client observed in that time window.

6. The method as in claim 5, wherein comparing the characteristics of the client-server communications from the partitioned time windows to determine measures of behavioral similarity between the compared time windows comprises:
  assessing, by the device, periodicity of the characteristics of the client-server communications between the compared time windows.
7. The method as in claim 5, wherein comparing the characteristics of the client-server communications from the partitioned time windows to determine measures of behavioral similarity between the compared time windows comprises:
  assessing, by the device, uniformity of the characteristics of the client-server communications between the compared time windows.
8. The method as in claim 5, wherein comparing the characteristics of the client-server communications from the partitioned time windows to determine measures of behavioral similarity between the compared time windows comprises:
  assessing, by the device, a proportion of successful versus unsuccessful client-server communications between the compared time windows.
9. The method as in claim 1, wherein the machine learning-based malware detector comprises a machine learning-based traffic classifier.
10. An apparatus, comprising:
  one or more network interfaces to communicate with a network;
  a processor coupled to the network interfaces and configured to execute one or more processes; and
  a memory configured to store a process executable by the processor, the process when executed configured to:
    generate one or more time series of characteristics of client-server communications observed in a network for a particular client in the network;
    partition the one or more time series into sets of time windows based on patterns present in the characteristics of the client-server communications by iteratively decreasing a span of a time window until a shortest time window is identified such that the characteristics of the client-server communications in time windows adjacent to a given one of the time windows exhibit a same pattern as that of the given time window;
    compare the characteristics of the client-server communications from the partitioned time windows to determine measures of behavioral similarity between the compared time windows, wherein the comparison includes:
      performing pairwise comparisons of the characteristics of the client-server communications between the client and different sets of servers from different ones of the partitioned time windows;
    provide the measures of behavioral similarity between the compared time windows as input to a machine learning-based malware detector; and
    cause performance of a mitigation action in the network when the machine learning-based malware detector determines that the particular client in the network is infected with malware.
11. The apparatus as in claim 10, wherein the pattern comprises client-server communications with a particular set of servers with which the particular client communicated.
12. The apparatus as in claim 10, wherein the characteristics of the client-server communications comprise one or more of: a number of traffic flows associated with the client-server communications, a number of bytes associated with the client-server communications, or a number of packets associated with the client-server communications.
13. The apparatus as in claim 10, wherein the apparatus compares the characteristics of the client-server communications from the partitioned time windows to determine measures of behavioral similarity between the compared time windows by:
  performing pairwise comparisons of the characteristics of the client-server communications between the particular client and the same server from different ones of the partitioned time windows.
14. The apparatus as in claim 10, wherein each of the partitioned time windows is associated with the characteristics of all of the client-server communications for the particular client observed in that time window.
15. The apparatus as in claim 14, wherein apparatus compares the characteristics of the client-server communications from the partitioned time windows to determine measures of behavioral similarity between the compared time windows by at least one of:
  assessing periodicity of the characteristics of the client-server communications between the compared time windows,
  assessing uniformity of the characteristics of the client-server communications between the compared time windows, or
  assessing a proportion of successful versus unsuccessful client-server communications between the compared time windows.
16. A tangible, non-transitory, computer-readable medium storing program instructions that cause a device to execute a process comprising:
  generating, by the device, one or more time series of characteristics of client-server communications observed in a network for a particular client in the network;
  partitioning, by the device, the one or more time series into sets of time windows based on patterns present in the characteristics of the client-server communications by iteratively decreasing a span of a time window until a shortest time window is identified such that the characteristics of the client-server communications in time windows adjacent to a given one of the time windows exhibit a same pattern as that of the given time window;
  comparing, by the device, the characteristics of the client-server communications from the partitioned time windows to determine measures of behavioral similarity between the compared time windows, wherein comparing includes
    performing pairwise comparisons of the characteristics of the client-server communications between the client and different sets of servers from different ones of the partitioned time windows;
  providing, by the device, the measures of behavioral similarity between the compared time windows as input to a machine learning-based malware detector; and
  causing, by the device, performance of a mitigation action in the network when the machine learning-based malware detector determines that the particular client in the network is infected with malware.
17. The tangible, non-transitory, computer-readable medium as in claim 16, wherein comparing the characteristics of the client-server communications from the partitioned time windows to determine measures of behavioral similarity between the compared time windows comprises:

performing, by the device, pairwise comparisons of the characteristics of the client-server communications between the particular client and the same server from different ones of the partitioned time windows.

\* \* \* \* \*

UNITED STATES PATENT AND TRADEMARK OFFICE
CERTIFICATE OF CORRECTION

| | | |
|---|---|---|
| PATENT NO. | : 10,616,267 B2 | Page 1 of 1 |
| APPLICATION NO. | : 15/648850 | |
| DATED | : April 7, 2020 | |
| INVENTOR(S) | : Karel Bartos et al. | |

It is certified that error appears in the above-identified patent and that said Letters Patent is hereby corrected as shown below:

In the Specification

Column 3, Line 37, should read:
shown in network 100 may support a given customer site, Column 10, Line 23, should read:
be represented as sequence $C^j = \{x^j_1, x^j_2, x^j_3, ...\}$ of flows.

Column 10, Line 38, should read:
In other words, each client-server communication $C^j$ can Signed and Sealed this
Twenty-eighth Day of July, 2020

Andrei Iancu
*Director of the United States Patent and Trademark Office*